(12) United States Patent
Salkintzis et al.

(10) Patent No.: US 8,640,174 B2
(45) Date of Patent: Jan. 28, 2014

(54) METHOD FOR RETRIEVING CONTENT, WIRELESS COMMUNICATION DEVICE AND COMMUNICATION SYSTEM

(75) Inventors: Apostolis K. Salkintzis, Athens (GR); Pelopidas Lappas, Marousi (GR)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/409,190

(22) Filed: Mar. 1, 2012

(65) Prior Publication Data

US 2013/0232534 A1 Sep. 5, 2013

(51) Int. Cl.
| | |
|---|---|
| H04M 11/00 | (2006.01) |
| H04W 4/00 | (2009.01) |
| H04W 36/00 | (2009.01) |
| H04W 72/00 | (2009.01) |
| H04B 1/02 | (2006.01) |
| H04B 1/04 | (2006.01) |
| H04N 7/16 | (2011.01) |

(52) U.S. Cl.
USPC ............ 725/62; 725/143; 725/148; 455/403; 455/422.1; 455/436; 455/450; 455/454; 455/91; 455/103

(58) Field of Classification Search
USPC .......................................................... 725/86
See application file for complete search history.

(56) References Cited

U.S. PATENT DOCUMENTS

| | | | |
|---|---|---|---|
| 7,487,112 B2 * | 2/2009 | Barnes, Jr. .................. | 705/26.8 |
| 7,539,175 B2 | 5/2009 | White et al. | |
| 7,616,559 B2 | 11/2009 | Thompson et al. | |
| 8,145,721 B2 | 3/2012 | Olsson et al. | |
| 2002/0102987 A1 * | 8/2002 | Souisse et al. ................ | 455/454 |
| 2002/0110149 A1 | 8/2002 | Roberts et al. | |
| 2009/0041015 A1 | 2/2009 | Zhang | |
| 2009/0207733 A1 | 8/2009 | Roberts et al. | |
| 2011/0080868 A1 | 4/2011 | Krishnaswamy et al. | |

(Continued)

FOREIGN PATENT DOCUMENTS

| | | |
|---|---|---|
| GB | 2475157 A | 5/2011 |
| WO | 2010027858 A2 | 3/2010 |

(Continued)

OTHER PUBLICATIONS

3GPP TSG SA WG2 Meeting #82, TD S2-105591; Jacksonville, Florida, USA; "Single IP Flow Transfer across Different 3GPP and non-3GPP Accesses" Motorola Mobility, Verision Wireless; Nov. 15-19, 2010, 3 pages.

(Continued)

Primary Examiner — Justin Shepard

(57) ABSTRACT

A wireless communication device retrieves a continuous stream of data by receiving a request for retrieval of content from a remote server, retrieving data of the requested content over a first radio access technology (RAT) interface and connection, and determining if the data retrieved meets a content playback threshold. When the retrieved data does not to meet the content playback threshold, the device activates a second RAT interface for retrieval of data of the requested content over a second RAT connection. The first and second RAT interfaces simultaneously retrieve part of the requested content during a multipath time period, which part is divided into at least a first portion for retrieval over the first RAT connection and a second portion for retrieval over the second RAT connection and which first and second portions are selected such that their retrieval is estimated to meet the content playback threshold.

18 Claims, 8 Drawing Sheets

(56) References Cited

U.S. PATENT DOCUMENTS

2011/0213827 A1 9/2011 Kaspar et al.
2012/0188949 A1 7/2012 Salkintzis et al.
2013/0095806 A1 4/2013 Salkintzis et al.

FOREIGN PATENT DOCUMENTS

WO 2010109054 A1 9/2010
WO 2010121205 A1 10/2010
WO 2013055649 A1 4/2013

OTHER PUBLICATIONS

Kuschnig, Robert et al.: "Improving Internet Video Streaming Performance by Parallel TCP-based Request-Response Streams", in Proceedings of the 7th IEEE Consumer Communications and Networking conference (CCNC), IEEE, Los Alamitos, CA USA, Jan. 2010, 5 pages.

Hampel T Klein Alcatel-Lucent G: "Enhancements to Improve the Applicability of Multipath TCP to Wireless Access Networks; draft-hampel-mptcp-applicability0wireless-networks-00.txt", Enhancements to Improve the Applicability of Multipath TCP to Wireless Access Networks; draft-hampel-mptcp-applicability-wireless-networks-00.txt, Internet Engeneering Task Force, IETF; Standardworkingdraft, Internet Society (ISOC) 4, Rue Des Falaise, Jun. 15, 2011, all pages.

Patent Cooperation Treaty, International Search Report and Written Opinion of the International Searching Authority for International Application No. PCT/US2013/027554, May 29, 2013, 14 pages.

Andersen et al., "Improving Web Availability for Clients with MONET" USENIX Association, NSDI '05: 2nd Symposium on Networked Systems Design & Implementation, pp. 115-128.

Multipath TCP Internet drafts, http://tools.ietf.org/wg/mptcp/.

Handley, M. "mptcp proxies" www.ietf.org/proceedings/80/slides/mptcp-4.ppt.

\* cited by examiner

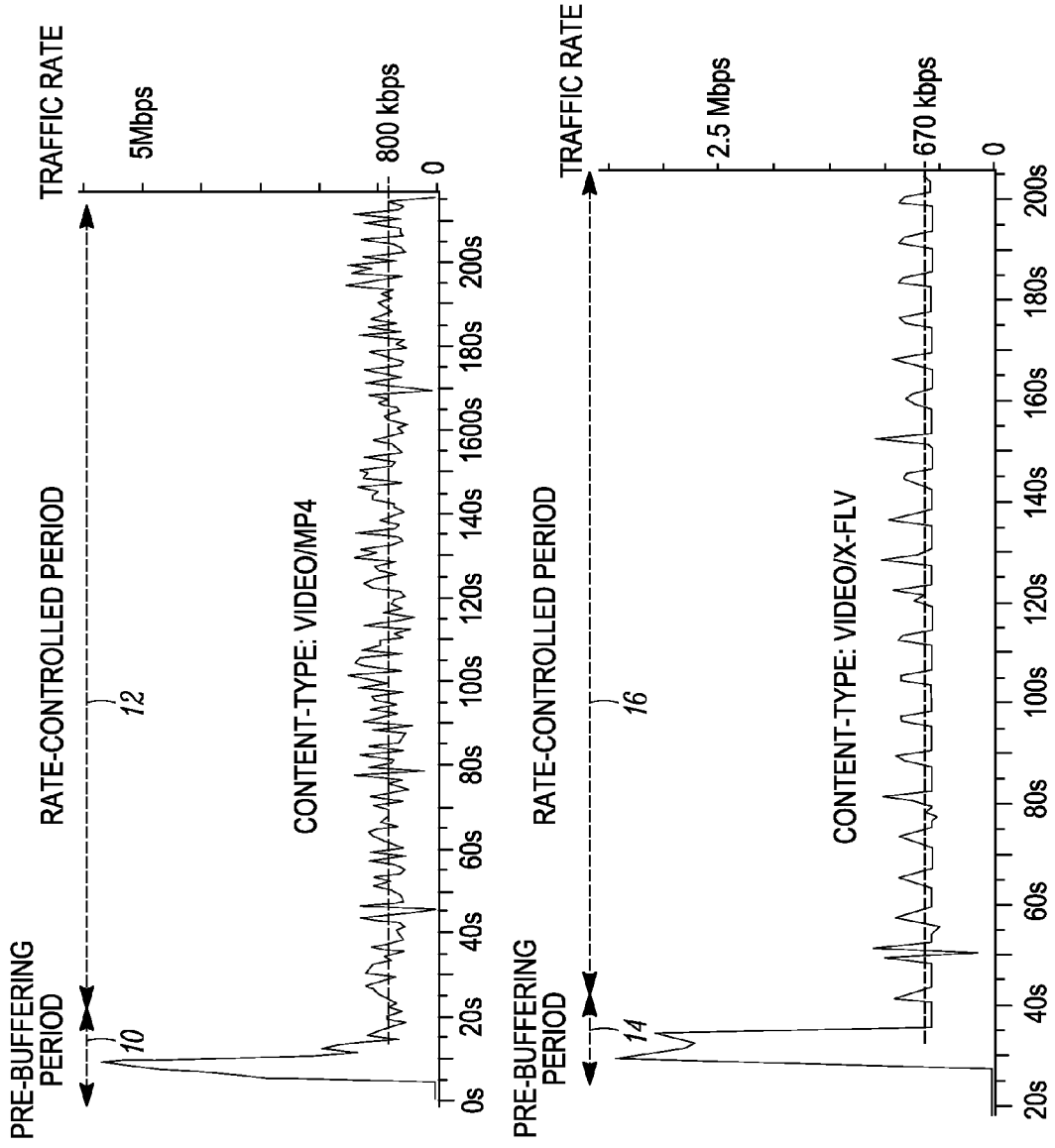

METHOD FOR RETRIEVING CONTENT, WIRELESS COMMUNICATION DEVICE AND COMMUNICATION SYSTEM

FIELD OF THE DISCLOSURE

This disclosure relates to a method for retrieving content by a wireless communication device having first and second radio access interfaces, such that multiple radio access technologies can be used at the same time to support retrieval of a continuous stream of data. A wireless communication device and a communication system are also disclosed and claimed.

BACKGROUND OF THE DISCLOSURE

Media content streaming is becoming more popular over the Internet and recent research shows that streaming traffic constitutes the biggest percentage of the overall Internet traffic today and it is expected that this percentage will grow in the future as mobile devices (typically, smart phones) are used increasingly for mobile streaming services. With an increasing number of mobile phone users experiencing mobile streaming, there is a need for streaming optimizations so that streaming experience on mobile devices is improved.

Many streaming services on the Internet are based on the so-called "progressive download" technology, which involves receiving content as a continuous stream of data. Such services include 'YouTube' and 'DailyMotion'. With "progressive download", the client requests the media content from a streaming server (typically, with the HTTP protocol) and, after a short "pre-buffering" delay, the client starts playing the media content while the download process continues. In effect, playback and download operate in parallel. In this case, it is important that the download rate matches the playback rate. If the communication channel cannot support a sufficiently large download rate, the playback will stop since the client eventually runs out of media content. On the other hand, if the download rate is higher than the playback rate, the client will eventually run out of buffering resources and will start dropping further media content or will advise the streaming server to stop sending more content (e.g., by closing the TCP receive window).

The traffic rate of a typical progressive download streaming session is shown in FIG. 1. Specifically, the traffic rate is shown when a mobile device requests a YouTube video file. This streaming session is conducted over the HTTP protocol. Initially, during the so-called "pre-buffering period" 10, the streaming server sends data to the client as fast as possible, in order to quickly fill up the playback buffer of the client and make it possible to start the playback. After the pre-buffering period however, the server reduces its transmission rate to about 800 Kbps (during the rate-controlled period 12), so that the client receives data at least as fast as it consumes data and maintains its playback buffer sufficiently filled up to protect against short communication outages.

FIG. 2 shows again the traffic rate of a streaming session, when a Flash-enabled client (e.g., the Microsoft Internet Explorer) requests a YouTube video file. In this case and as before, the pre-buffering period 14 is followed by the rate-controlled period 16, where the traffic rate, in this example, is approximately constant at about 670 Kbps. The traffic rate during the rate-controlled period depends on the encoded rate of the requested video file (and, thus, on the quality of the video file). The larger the encoded rate (or the video quality), the higher the traffic rate.

One problem with progressive download streaming is that when the communication channel gets congested for some time and cannot support the required traffic rate (the rate that matches the playback rate), then the playback buffer of the client may run out of media content, thus causing the streaming session to stop (point 18 in FIG. 3). This creates a bad user experience. One easy way to tackle this problem is to implement clients with large playback buffers. However, such large buffers may considerably increase the pre-buffering period, which again has a negative impact on the user experience, plus it demands considerable memory resources in mobile devices.

There are currently several streaming technologies designed to operate efficiently over time-varying mobile communications channels, for example, adaptive progressive download streaming, adaptive HTTP Live Streaming (HLS) and 3GPP Dynamic Adaptive Streaming over HTTP (DASH).

With adaptive progressive download streaming, in order to adapt to varying channel conditions, the streaming server can modify its transmission rate based on Quality of Service (QoS) measurements reported by the client. This situation is schematically shown in FIG. 4. At the beginning of an adaptive rate-controlled period 24, the server transmits the media with the highest available quality, which corresponds to transmission rate 1. At some point, the communications channel becomes congested and cannot support the transmission rate 1. As a consequence, the client observes a transmission rate lower than transmission rate 1 for a given time period and thus, it reports this observation back to the streaming server. In response, the server switches to a lower transmission rate (at point 26), which corresponds to a lower-quality media content. Now the media content is transmitted with a transmission rate 2. If the communications channel is further congested, the channel may become incapable to support transmission rate 2 and, again, the server (after receiving the client's feedback) switches to an even lower rate (at point 28), transmission rate 3. This corresponds to even a lower streaming quality. Despite the lower quality, the streaming session continues. Of course, if the communications channel is later improved, the transmission rate may be scaled up to improve the streaming quality. As a consequence, the streaming session may run uninterrupted with quality that matches the observed channel conditions.

Disadvantages of adaptive progressive download is that (i) it is complex, since it requires the client to constantly derive QoS measurements and feedback these measurements to the server and (ii) it requires extra communication resources to support the signaling between the client and the server. In addition, when the transmission rate is reduced to adapt to deteriorating channel conditions, the streaming quality and, thus, the viewing experience are considerably reduced. So, high quality streaming cannot be guaranteed. A further disadvantage is that the media content at the server should be encoded with various encoding rates (i.e., with various levels of quality), which renders the whole process more complicated and costly.

An article entitled 'Apple proposes HTTP streaming feature as IETF standard' (retrievable via http://arstechnica.com/web/news/2009/07/apple-proposes-http-streaming-feature-as-a-protocol-standard.ars) gives a brief overview of HLS and DASH as described in 3GPP Technical Specification TS 26.247 (v10.0.0), entitled 'Transparent end-to-end Packet-switched Streaming Service (PSS); Progressive Download and Dynamic Adaptive Streaming over HTTP (3GP-DASH)'.

HLS and DASH support media streaming over a single communication path (or a single radio access technology connection) and adaptive streaming by switching the rate of the encoded media content to match the available transport capacity. With these technologies, the client retrieves the media content as a sequence of small "chunks" of constant duration (typically, near to 10 s (seconds)). Each chunk can be selected from a plurality of chunks available for the same portion of the media content, e.g., a portion of media content may be represented by a high quality chunk, medium quality chunk, etc. The high quality chunk will have more information and so will be greater in size than the medium quality chunk. Every time the client retrieves a chunk, it measures the retrieval duration. When the duration exceeds a certain threshold (or when other implementation triggers apply), the client requests the next chunk with reduced quality and thus with reduced size that can be retrieved faster. This way, even when the capacity of the transport channel is reduced (e.g., due to channel variations and transmission effects), the streaming flow can be sustained, albeit with reduced quality.

An advantage of HLS/DASH technologies is that the streaming flow dynamically adapts to the available transport capacity and features considerable robustness and reliability in mobile communication systems. A disadvantage, however, is that the adaptation is performed at the expense of quality, that is, when the transport channel deteriorates and cannot support high data rate, the streaming flow is sustained but with reduced quality. For example, when a mobile device uses HLS or DASH to stream a video content over WiFi, the stream content will switch to low quality when the WiFi network gets congested (e.g., when it cannot support TCP throughput of more than 700-1000 Kbps) and cannot support the high quality stream. This has a negative effect on the user experience. Another disadvantage is that HLS/DASH technologies require the media content to be encoded in a special and somewhat complicated way (so that chunks are created). Therefore, media content that is already available in the Internet cannot be streamed with HLS/DASH technologies.

A difference between the HLS/DASH technologies and the adaptive progressive download technology is that the former utilizes client-based adaptation, whereas the latter utilizes server-based adaptation. With client-based adaptation, it is the client which decides when to modify the streaming quality (e.g., by requesting chunks of lower quality), whereas with server-based adaptation the streaming server decides when to change its transmission rate (and thus send content of lower quality) by taking into account the feedback provided by the client. Due to the complexity of the server-based adaptation, where the client and the server need to constantly exchange signaling to support the rate adaptation on the server side, the current trend is towards the client-based adaptation and HLS/DASH streaming. However, as noted above, the vast majority of the streaming content in the Internet today is not encoded for HLS/DASH streaming, so streaming with progressive download is expected to dominate for many more years.

In conclusion, HLS and 3GPP DASH do provide efficient and adaptive technologies for mobile media streaming over a single communications path (or a single radio technology), but they cannot maintain high quality streaming experience when the transport channel deteriorates significantly.

In an effort to improve the video streaming performance, several publications propose the use of multiple simultaneous IP interfaces to retrieve video chunks in parallel. For example, in an article entitled 'Improving Internet Video Streaming Performance by Parallel TCP-based Request-Response Streams' by Robert Kuschnig, Ingo Kofler and Hermann Hellwagner (retrievable via http://alvand.basu.ac.ir/~nassiri/courses/AdvNetworks/papers/paper25.pdf), the authors propose a request-response-based client-driven streaming system, much similar to HLS/DASH, which however uses multiple interfaces to simultaneously retrieve multiple chunks. The reported performance results indicate that multipath chunk retrieval can provide an overall TCP throughput that is relatively stable over a vast range of round trip time (RTT) values and much higher compared to single path chunk retrieval. In this publication, however, the mobile device keeps multiple interfaces continuously active. As a result, such multipath streaming mechanisms can have a considerable negative impact on battery consumption.

Another known technology that can be used for enhanced streaming experience is Multipath TCP (MPTCP) (see, for example, the Multipath TCP Internet drafts which are retrievable via http://tools.ietf.org/wg/mptcp/).

With MPTCP, the client and the server establish multiple, parallel TCP connections (typically over different communication technologies) which are simultaneously used to retrieve the media content. The advantage is that MPTCP can provide increased overall throughput by exploiting the available capacity over multiple communication paths. So, when a HTTP streaming session is conducted on top of MPTCP, the overall transport capacity can be increased and thus improved streaming experience is expected since low-quality media chunks will rarely be required. A disadvantage however is that both the client and the server must be upgraded to support MPTCP which in most cases can be impractical. To alleviate this issue, an MPTCP proxy can be used between the client and the server as proposed in a presentation entitled 'mptcp proxies' by Mark Handley (retrievable via www.ietf.org/proceedings/80/slides/mptcp-4.ppt). In this case, only the client and the proxy need to support MPTCP and not the streaming/media servers. Yet, there is still a requirement to upgrade the network infrastructure. Also, the use of proxies (or other middle boxes) breaks the end-to-end transparency and can create several issues, e.g., with applications that carry transport information in the payload (FTP, SIP, RTSP, etc.). In addition, with MPTCP it is the server that performs the transmission scheduling (i.e., the allocation of media data to the available communication paths or TCP sub-flows) and therefore, the client cannot decide which path or radio access technology to use. This is an additional disadvantage because the server may choose to send data over the most expensive communication path and the client has no power to avoid or otherwise control this behaviour. In addition, as is the case with all streaming technologies that split the media content into chunks, the encoding process is somewhat complicated and is not compatible with the encoding process that is widely used currently in the Internet.

BRIEF DESCRIPTION OF THE DRAWINGS

A method for retrieving content by a wireless communication device having first and second radio access interfaces, a wireless communication device and a communication system in accordance with different aspects of the disclosure will now be described, by way of example only, with reference to the accompanying drawings in which:

FIG. 1 is a graphical representation of streaming traffic rate when viewing a YouTube video file with a mobile MPEG4 player;

FIG. 2 is a graphical representation of streaming traffic rate when viewing a YouTube video file with a Flash player;

DETAILED DESCRIPTION OF THE DRAWINGS

The present disclosure will be described with reference to a wireless communication device capable of operating with a first access network and a second access network, with the first access network being a public WiFi network and the second access network being a 3G UMTS network. It will however be appreciated that the present disclosure may apply to other types of networks and wireless communication devices capable of operating with any combination of two or more different networks, which may be selected from, for example: GSM; Enhanced Data rates for GSM Evolution (EDGE); General Packet Radio System (GPRS); CDMA, such as IS-95; CDMA2000; WCDMA or Universal Mobile Telecommunications System (UMTS); Fourth Generation Long Term Evolution (LTE); other wide area network communication systems; Private Mobile Radio (PMR); Worldwide Interoperability for Microwave Access (WIMAX); WLAN; other 3G or 4G networks; or the like. By describing the disclosure with respect to 3G UMTS and WiFi networks, it is not intended to limit the disclosure in any way.

The wireless communication device in accordance with the disclosure may be a portable or mobile telephone, a Personal Digital Assistant (PDA), a wireless video or multimedia device, a portable computer, a netbook, a tablet device, an embedded communication processor or similar wireless communication device. In the following description, the communication device will be referred to generally as mobile device for illustrative purposes and it is not intended to limit the disclosure to any particular type of wireless communication device.

Figure 3:
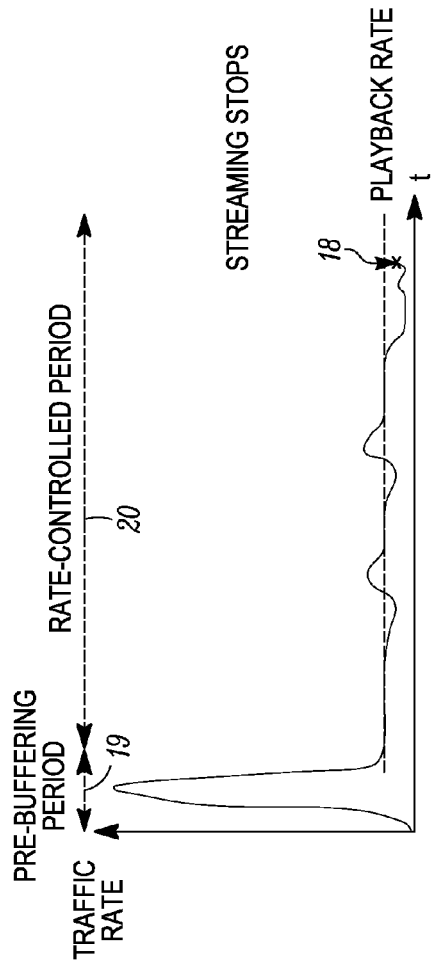
FIG. 3 is a graphical representation of traffic rate when streaming content over a communications channel showing streaming stopping when the communications channel cannot support the required traffic rate.
Figure 4:
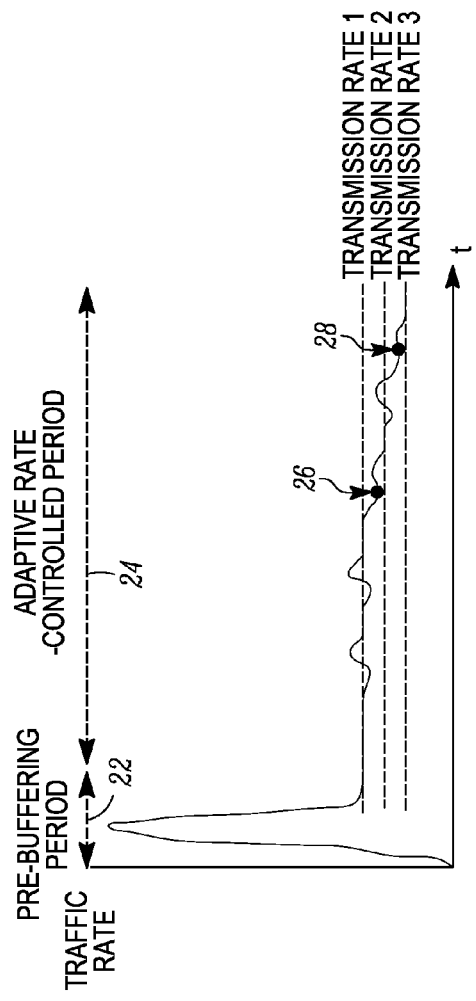
FIG. 4 is a graphical representation of streaming traffic rate for adaptive progressive download streaming.
Figure 5:
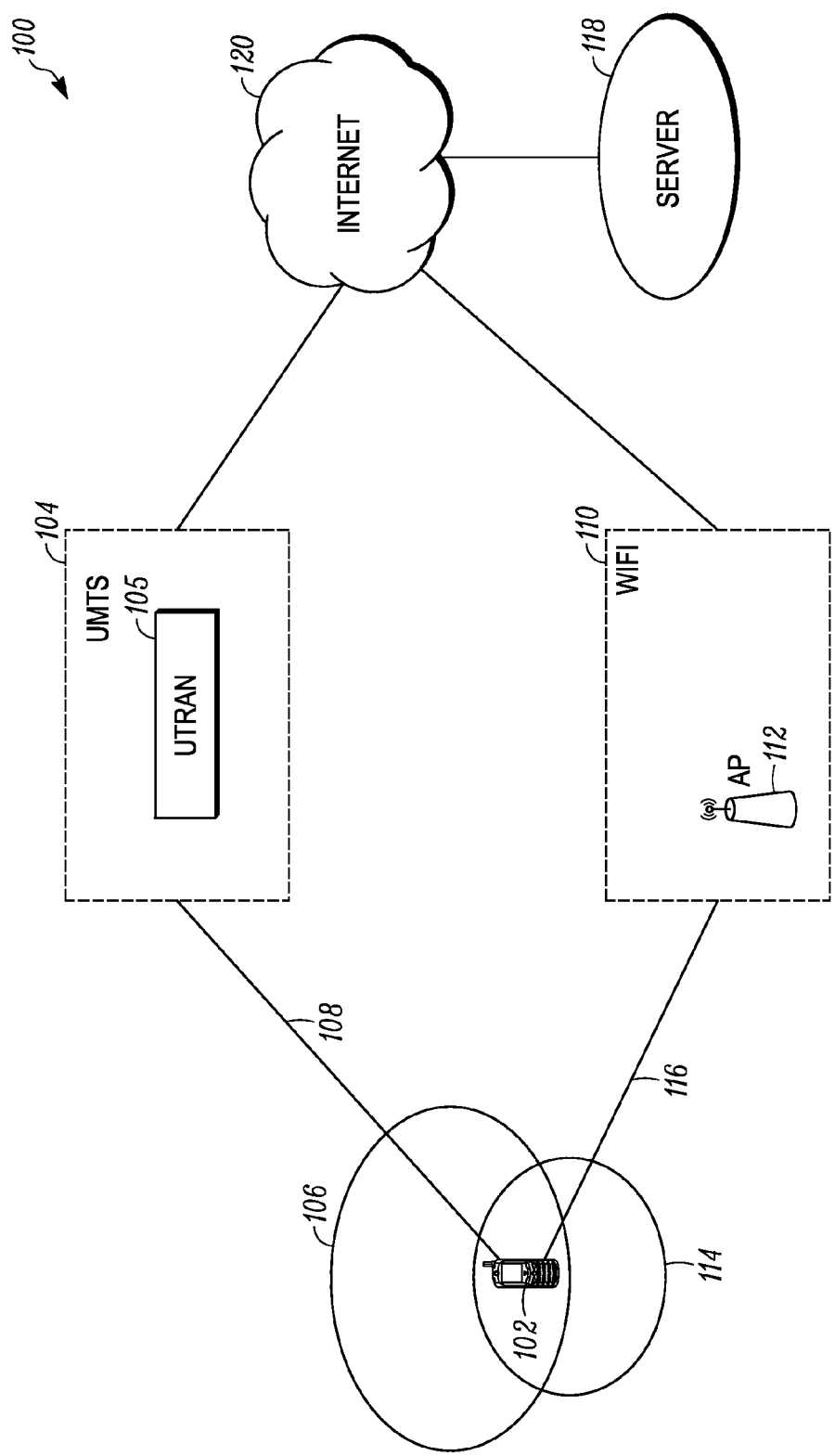
FIG. 5 is a block schematic diagram of a communication system in accordance with an example of an embodiment of the present disclosure.

Referring firstly to FIG. 5, a communication system 100 in accordance with an example of an embodiment of the disclosure comprises at least one mobile device 102 (but typically a plurality of mobile devices) capable of communicating with a first access network, such as WiFi network 110, and a second access network, such as UMTS network 104.

The UMTS network 104 provides a plurality of coverage areas or cells, such as coverage area or cell 106 of UTRAN 105, as is well known in the art. The mobile device (also referred to as User Equipment UE) 102 can operate or communicate with the UMTS network 104 via radio communication link 108. The UMTS network 104 is communicatively coupled to a remote server 118 in order to provide services to a user of the mobile device 102.

The WiFi network 110 provides a coverage area 114 served by at least one access point (AP) 112. The mobile device 102 can operate or communicate with the WiFi network 110 via radio communication link 116. The WiFi network 110 is also communicatively coupled to the remote server 118 in order to provide services to a user of the mobile device 102.

In FIG. 5, the UMTS network 104 and WiFi network 110 are communicably coupled to the remote server 118 via the Internet 120. The UMTS network 104 and WiFi network 110 may however be coupled to the remote server 118 by alternative communication means, such as a leased line, a virtual private network (VPN) or similar means.

The UMTS network 104 and the WiFi network 110 may also be coupled to one or more other networks (not shown), such as a packet data network, a CS (Circuit Switched) network, an IP Multimedia Subsystem (IMS) network, in order to provide services to or from a mobile device.

It will be appreciated that although only coverage area 106 is shown in FIG. 5, the UMTS network 104 has a plurality of coverage areas and each coverage area is served by one or more base stations (not shown), known as NodeBs, which are part of the UTRAN 105. In addition, the WiFi network 110 may have a plurality of access points APs 112.

Figure 6:
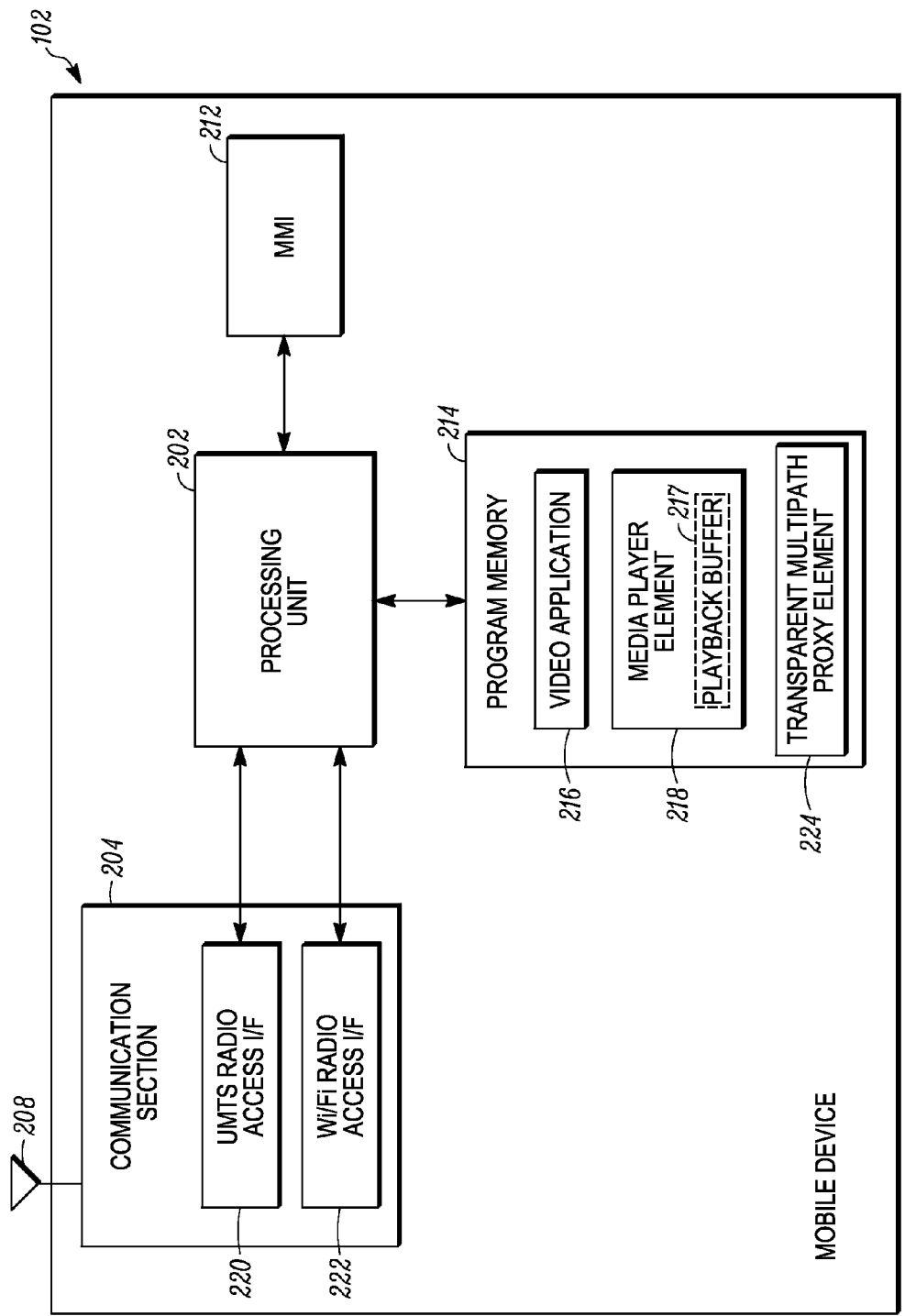
FIG. 6 is a block schematic diagram of a wireless communication device in accordance with an example of an embodiment of the present disclosure.

FIG. 6 is a block diagram of a wireless communication device, such as a mobile device 102 shown in FIG. 5, in accordance with an embodiment of the disclosure. As will be apparent to a skilled person, FIG. 6 shows only the main functional components of an exemplary mobile device 102 that are necessary for an understanding of the invention.

The mobile device 102 comprises a processing unit 202 for carrying out operational processing for the mobile device 102. The mobile device 102 also has a communication section 204 for providing wireless communication via a radio communication link with, for example, a NodeB (not shown) of the UTRAN 105 of the UMTS network 104 or the AP 112 of the WiFi network 110. The communication section 204 may comprise elements which are part of a UMTS radio access interface 220 of the mobile device 102 and elements which are part of a WiFi radio access interface 222 of the mobile device 102. The communication section 204 typically includes at least one antenna 208, a receiver (not shown) and a transmitter (not shown), at least one modulation/demodulation section (not shown), and at least one coding/decoding section (not shown), for example, as will be known to a skilled person and thus will not be described further herein. The communication section 204 may include one set of elements for the UMTS radio access interface 220 and one set of elements for the WiFi radio access interface 222 or the interfaces 220, 222 may share elements. The communication section 204 is coupled to the processing unit 202. Thus, the mobile device 102 may communicate with the remote server 118 via the first radio access interface (e.g., WiFi radio access interface 222) and a first radio access technology connection (e.g., a TCP connection via the WiFi radio access interface 222) and via the second radio access interface (e.g., UMTS radio access interface 220) and a second radio access technology connection (e.g., a TCP connection via the UMTS radio access interface 220).

The mobile device 102 also has a Man Machine Interface MMI 212, including elements such as a key pad, microphone, speaker, display screen, for providing an interface between the mobile device and a user of the mobile device 102. The MMI 212 is also coupled to the processing unit 202.

The processing unit 202 may be a single processor or may comprise two or more processors carrying out all processing required for the operation of the mobile device 102. The number of processors and the allocation of processing functions to the processing unit is a matter of design choice for a skilled person. The mobile device 102 also has a program memory 214 in which are stored programs containing processor instructions for operation of the mobile device 102. The programs may contain a number of different program elements or sub-routines containing processor instructions for a variety of different tasks, for example, for: communicating with the user via the MMI 212; processing signalling messages (e.g., paging signals) received from the UTRAN 105 and WiFi network 110; and performing neighbouring, coverage area measurements. Specific program elements stored in program memory 214 include a media application 216 (which is shown and described below as a video application 216), a media player element 218 and a Transparent Multipath Proxy (TMP) element 224. The operation of the media application 216, media player element 218 and TMP element 224 will be described in more detail below. The media application 216 is shown and will be described as a video application 216 (such as a YouTube client) by way of example only. It will however be appreciated that the media application may be any application that controls the processing unit 202 to render the requested content from the remote server 118 and supports streaming and that there could be one or more media applications stored in program memory 214. The media player element 218 is shown as a separate element in the program memory 214 and may be shared by several applications. In an alternative arrangement, the media player element is embedded into the video application 216 for use by the video application 216.

Figure 7:
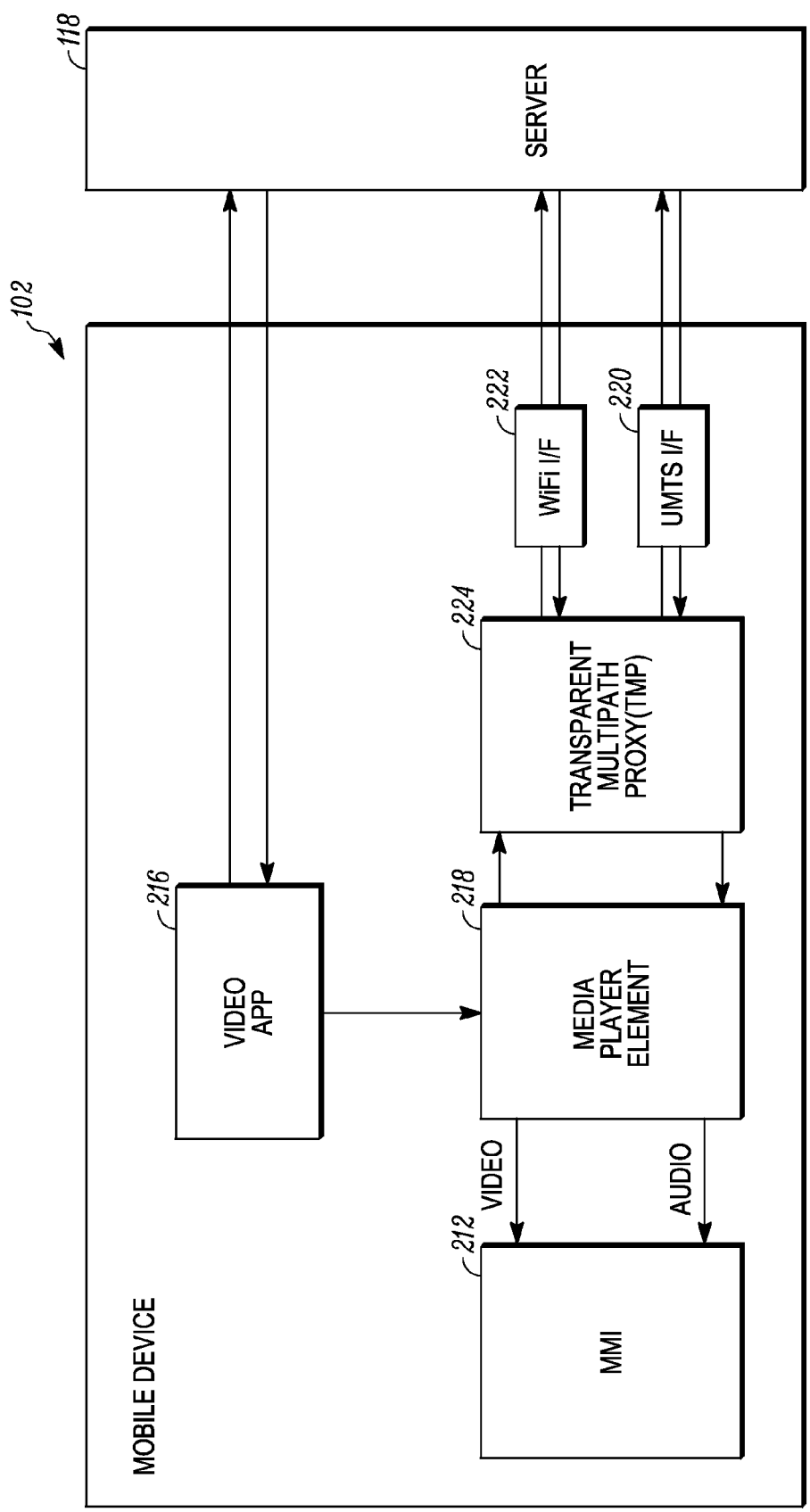
FIG. 7 is a simplified block schematic diagram showing elements of the wireless communication device of FIG. 6 as logical blocks.

The media player element 218 further includes a playback buffer 217 for storing data of the requested content received at the mobile device 102 and for releasing the stored data as the media player element 218 plays back the requested content. FIG. 7 is a schematic diagram showing part of the mobile device 102 as logical blocks including the video application 216, media player element 218 and TMP element 224 to illustrate the relationship and interaction between the video application 216, media player element 218, TMP element 224, WiFi radio access interface 222 and UMTS radio access interface 220, MMI 212 and remote server 118.

The media player element 218 further includes a playback buffer 217 (shown in FIG. 6 but not shown in FIG. 7) for storing data of the requested content received at the mobile device 102 and for releasing the stored data as the media player element 218 plays back the requested content.

Typically, a user of the mobile device 102 browses content that is available for streaming on a server (e.g., remote server 118) by using the facilities provided by the video application 216. When the user selects a video content to view, the video application 216 passes a suitable request to the media player element 218, which undertakes all actions for streaming and rendering the selected video content from the remote server 118. The TMP element 224 is configured to intercept the traffic between the media player element 218 and the remote server 118, and decide when content should be retrieved using only the WiFi radio access interface 222 or both the WiFi radio access interface 222 and the UMTS radio access interface 220 (e.g., multipath communication over first and second radio access interfaces). For example, the video application 216 sends a request to the media player element 218 which includes the URL for the video content requested by the user. In response, the media player element 218 requests and receives the video content from the remote server 118 via the TMP element 224 using the URL and renders the streamed video content, for example, via a display screen and speaker of the MMI 212.

Figure 8:
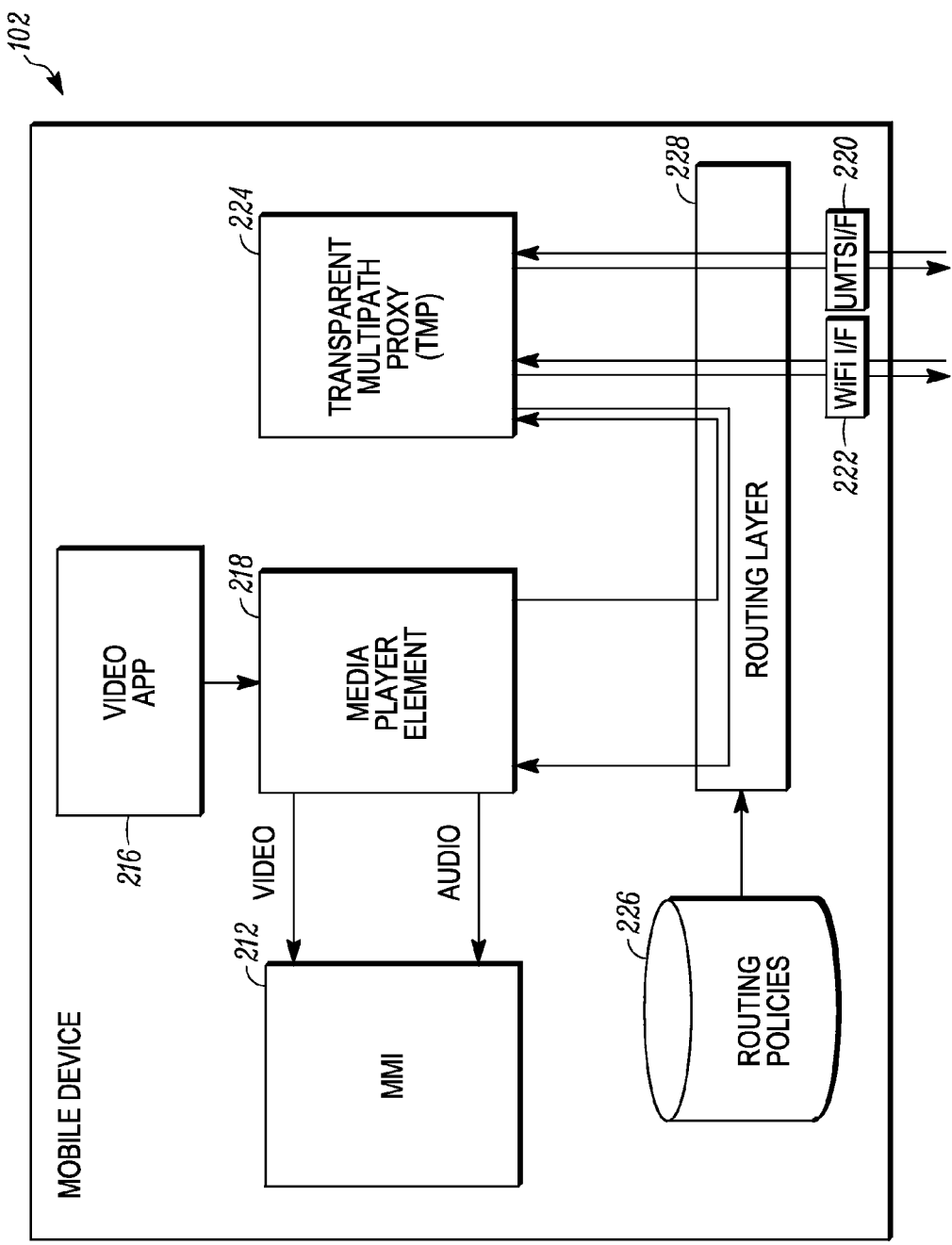
FIG. 8 is a simplified block schematic diagram like FIG. 7 and showing elements of the wireless communication device of FIG. 6 as logical blocks in more detail.

The operation of the TMP element 224 is transparent to the other software elements in the mobile device 102, which means that the existing software elements (including the media player element 218) do not require any changes or updates in order to implement the TMP element 224 in accordance with the disclosure. In order to accomplish this transparency, the traffic of the media player element 218 is routed through the TMP element 224 by configuring appropriate routing policies in the mobile device 102. FIG. 8 shows parts of the mobile device 102 as logical blocks including the routing policies as a logical block 226, which when applied, configure a routing layer 228 such that all traffic of the media player element 218 is routed to the TMP element 224 instead of being sent to the remote server 118 directly. The routing policies are typically stored in program memory 214 or other storage medium (e.g., SD card, hard disk, etc.) and are applied, for example, when the TMP element 224 is activated when the mobile device 102 powers on or when requested by an application or when requested by a user. For example, a user may select the TMP element 224 from a menu (as with other applications) in order to enable multipath streaming functionality. When the TMP element 224 receives a request from the media player element 218, the TMP element proxies the request to the remote server 118 and then intercepts and analyses all traffic flowing between the media player element 218 and the remote server 118. When the TMP element 224 is not activated or selected, the routing policies 226 do not configure routing layer 228 and traffic is routed between the media player element 218 and the remote server 118 directly, as with known architectures which do not include a TMP element. The operation of TMP element 224 is described in more detail below.

In prior art architectures which do not include a TMP element, the media player element in the mobile device communicates directly with the remote server and operates in accordance with a specific streaming technology, such as adaptive progressive download, non-adaptive progressive download (e.g., YouTube), HLS, etc.

Figure 9:
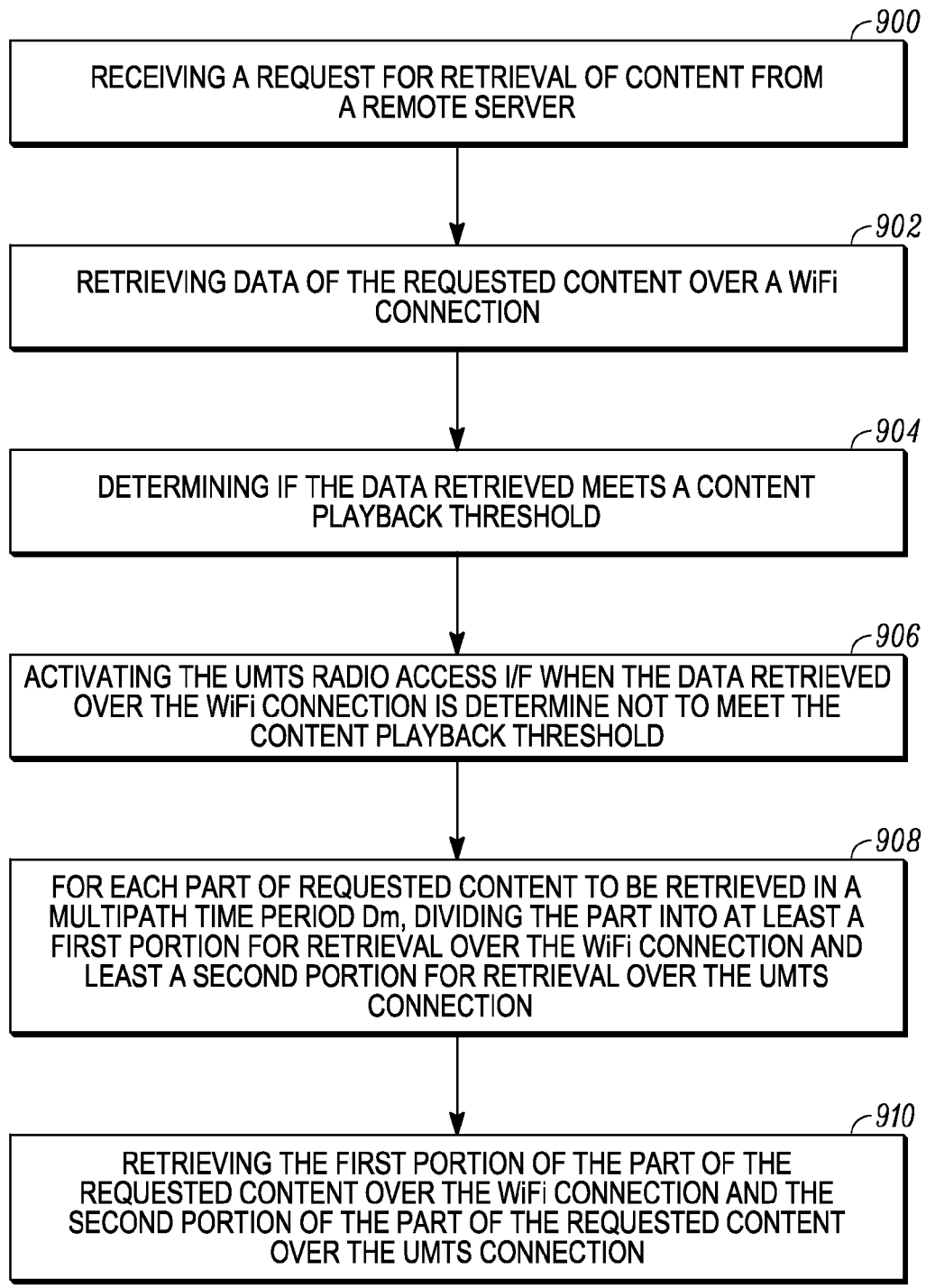
FIG. 9 is a flow diagram showing an example method for retrieving content by a wireless communication device in accordance with an embodiment of the disclosure.

Referring now to FIG. 9 which shows steps of a method for retrieving content by a wireless communication device having a first radio access interface for communication with a first access network, such as WiFi radio access interface 222 for communication with WiFi network 110, and a second radio access interface for communication with a second access network, such as UMTS radio access interface 220 for communication with UMTS network 104, in accordance with an example of an embodiment of the disclosure. The method shall be described with reference to the communication system 100 of FIG. 5 and the mobile device 102 of FIG. 6 by way of example. It is not intended to limit the invention to the particular types of networks shown and described with reference to FIG. 5. The method will also be described with reference to FIG. 10 which shows an example of changes in traffic rate when using the method in accordance with the present invention.

In step 900, a request for retrieval of content from the remote server 118, communicably coupled to the UMTS network 104 and the WiFi network 110, is received at the mobile device 102. The request for retrieval of content may be received when only the first radio access interface 222 is active or when both the first 222 and second 220 radio access interfaces are active. For example, the mobile device 102 is in coverage area 114 and is communicating with WiFi network 110 via an active WiFi radio access interface 222. The request for retrieval may be received from a user of the mobile device 102. The content may be video, a web page, a file or other type of media content available from the remote server 118. The requested content may include different types of media content.

In response to receiving a request for content, the mobile device 102 then retrieves data of the requested content from the remote server 118 as a continuous stream of data over a first radio access technology connection and via the first radio access interface, step 902. In the example arrangement when the first radio access interface is the WiFi radio access interface 222, data of the requested content is retrieved over a WiFi connection. This may be controlled by the processing unit 202 under control of the video application 216, media player element 218, and TMP element 224.

The remote server 118 is configured to transmit the requested content as a continuous stream of data. In other words, the delivery or retrieval method used to deliver the requested content is a progressive download streaming method, such as video streaming (live or not live). The mobile device 102 therefore receives the requested content transmitted from the remote server 118 as a continuous stream of data.

In an example arrangement, when WiFi connectivity is available, a user of the mobile device 102 may browse a web site and identify a video clip (e.g., YouTube video) that the user wishes to retrieve by means of a video application (e.g., video application 216) communicating with the remote server 112 over a WiFi connection. The user then starts a progressive download streaming session over the WiFi radio access interface 222 using the video application 216.

In this example, the video application 216 sends a request to the media player element 218 to retrieve and play the selected video content. The content is typically described by means of a uniform resource locator (URL). Subsequently, the media player element 218 initiates a connection to the remote server 118 (the name of which is part of the URL). This connection request, however, is redirected to the TMP element 224 by means of the routing policies 226 in the mobile device 102. The TMP element 224 accepts the connection request from the media player element 218 and then establishes a WiFi connection to the remote server 118 over the WiFi radio access interface 222. After the connections between the TMP element 224 and media player 218 and the TMP element 224 and remote server 118 have been established, the TMP element 224 relays data between the remote server 118 and the media player element 218 and operates completely transparently, in that neither the media player element 218 nor the remote server 118 can identify the TMP element's existence.

Once the TMP element 224 forwards the content request from the media player element 218 to the remote server 118 and the connections have been established, the retrieval of data starts with a "pre-buffering period" 1000 (see FIG. 10) during which the remote server 118 sends data to the mobile device 102 as fast as possible in order to quickly fill up the playback buffer 217 associated with the media player element 218 and make it possible to start the playback of the requested content. At the end of the pre-buffering period 1000 however, the remote server 118 reduces its transmission rate (for example to about 800 Kbps) for a rate-controlled period 1002, so that the mobile device 102 receives data as fast as it consumes data and maintains its playback buffer 217 sufficiently filled up to protect against short communication outages.

After retrieval of some data over the WiFi connection, the mobile device 102 is then configured to determine if the data retrieved meets a content playback threshold, step 904. This step may be performed by the processing unit 202 under the control of the TMP element 224 after the end of the pre-buffering period 1000. The content playback threshold is defined by the data rate required to provide continuous playback of the requested content by the mobile device 102. In an example arrangement, the mobile device 102 determines a rate of playback of the content by the mobile device 102 (which depends on the encoding rate used to create the content and is the rate by which data from the playback buffer 217 is consumed) and determines if the data retrieved meets the content playback threshold by comparing the rate of retrieval of data by the mobile device 102 over the WiFi connection (for example, by the TMP element 224 measuring the rate of retrieval of data over the WiFi connection) with the rate of playback. The mobile device 102 determines the data retrieved does not meet the content playback threshold when the rate of retrieval of data is less than the rate of playback of content for a defined period of time.

When the mobile device 102 determines that the data retrieved does not meet the content playback threshold, the mobile device 102 (e.g., via the processing unit 202 and the TMP element 224) activates the UMTS radio access interface 220, step 906. In other words, the mobile device 102 activates multipath reception.

In an example implementation, determining the rate of playback of content may include estimating the rate of playback of content by determining a first mean or average rate (shown as Tm in FIG. 10) of retrieval of data (also referred to as first mean traffic rate) over a first time period. This estimation is performed by the mobile device 102 over the WiFi connection after the start of data retrieval (e.g., after the pre-buffering period 1000 and after the rate-controlled period 1002 commences). The first time period may be for example 15 seconds after the rate-controlled period 1002 commences. The first mean rate Tm is determined once after the start of data retrieval and is used as an estimation of the rate of playback.

The rate of retrieval of data may be estimated by the mobile device 102 by determining a second mean or average rate (Ts) of retrieval of data over a second time period. This second mean or average rate is also referred to as second mean traffic rate. This estimation is performed by the mobile device 102 over the WiFi connection after the first mean rate Tm has been determined. The second time period is after the first time period and is less than the first time period. The second time period may be 3-5 seconds. The second mean rate Ts may be estimated periodically, for example, the second mean rate Ts may be estimated every 3-5 seconds or other suitable second time period.

The first mean rate Tm is then compared with the second mean rate Ts and the data retrieved is determined not to meet the content playback threshold when the second mean rate Ts is less than the first mean rate Tm for a defined period of time, for example by a defined amount.

For example, the first time period may be 15 seconds and the first mean rate Tm is estimated 15 seconds after the rate-controlled period 1002 commences. The second time period may be 3-5 seconds and the second mean rate Ts is estimated every 3-5 seconds after the first mean rate Tm has been estimated. The second radio access interface 220 may be activated when the second mean rate Ts is less than the first mean rate Tm by 30% for a defined period of time, e.g., 10 seconds. In other words, if the estimated rate of data retrieval (second mean rate Ts) remains below 30% of the estimated playback rate (first mean rate Tm) for 10 seconds, then the playback buffer 217 is running the risk of getting empty, which will cause playback to stop. To avoid this, the second radio access interface 220 may be activated and used for data retrieval in parallel to data retrieval from the first radio access interface 222. Using both radio access interfaces 220, 222 for data retrieval will increase the second mean rate Ts, i.e., the average rate of data retrieval. It will be appreciated that other values and combinations of values for these parameters may be determined. The values for the parameters are chosen such that the measured rate of retrieval does not reach a rate at which playback of the requested content stops and such that multipath reception is activated (as is discussed in more detail below) before the playback buffer 217 runs out of data.

The TMP element 224 may measure and store the first mean rate Tm and second mean rate Ts of the observed data traffic from the remote server 118 as discussed above. The first and second time periods and the defined amount may be pre-configured in the TMP element 224, for example, at factory set up or programmed subsequently. In order to avoid the playback buffer 217 running out of data which may result in the playback of the requested content stopping, the TMP element 224 checks that the rate of traffic received from the remote server 118 (i.e., rate of data retrieval) does not fall below the first mean traffic rate Tm for a long period. Consequently, after measuring the first mean traffic rate Tm, the TMP element 224 starts measuring the second mean traffic rate Ts of traffic from the remote server 118, e.g., by taking traffic rate measurements periodically, e.g., every second or 3-5 seconds as above. When the traffic rate measurements taken periodically fall well below the mean traffic rate Tm for some defined period of time (e.g., 10 seconds), the TMP element 224 activates multipath reception. In an example, the criteria for activation of multipath reception may be, for example, the traffic rate measurements (Ts) taken periodically is below 70% of the mean traffic rate Tm for 10 seconds.

As is discussed in more detail below, an additional or alternative criteria for activation of multipath reception may be that the available data in the playback buffer 217 is enough to sustain playback for a period of time which is below a threshold, e.g., for the next 10 seconds only. This can be implemented if the TMP element 224 can determine the amount of data in the playback buffer 217 of the media player element 218.

When the data retrieved over the WiFi connection is determined not to meet the content playback threshold, the processing unit 202 is arranged under the control of the TMP element 224 to activate the second radio access interface (e.g., the UMTS radio access interface 220) for retrieval of data of the requested content over a second radio access technology connection (e.g., UMTS connection), step 906. In other words, the processing unit 202 is arranged under the control of the TMP element 224 to activate multipath reception when the data retrieved over the WiFi connection is determined not to meet the content playback threshold. This is identified by 'multipath activated' at point 1006 in FIG. 10 when the two connection paths are activated. The UMTS radio access interface 220 may be already active in which case, the processing unit 202 under the control of the TMP element 224 activates the UMTS radio access interface 220 by utilising the already active UMTS radio access interface 220 to establish a UMTS connection for the retrieval of data of the requested content. If the UMTS radio access interface 220 is not active, the processing unit 202 under the control of the TMP element 224 must first switch the UMTS radio access interface 220 to an active state and then establish a UMTS connection for the retrieval of data of the requested content on activating the UMTS radio access interface 220.

Figure 10:
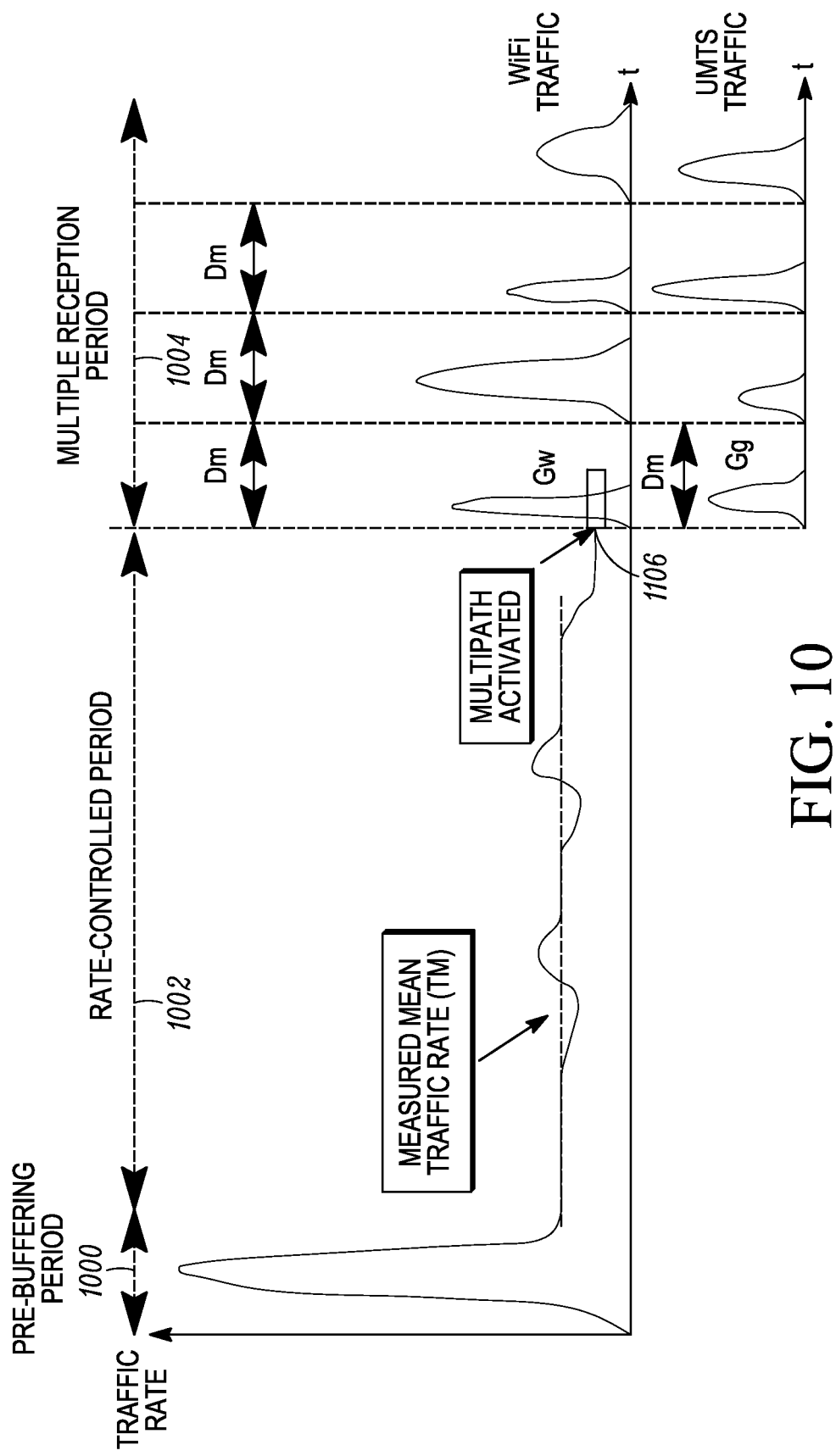
FIG. 10 is a graphical representation of an example traffic rate when using the method for retrieving content in accordance with an embodiment of the disclosure.

The WiFi 222 and UMTS 220 radio access interfaces are then used to retrieve part of the requested content during a multipath time period (shown as Dm in FIG. 10). The WiFi 222 and UMTS 220 radio access interfaces may be used during at least one multipath time period Dm to retrieve at least one part of the requested content. If required by the radio conditions, the WiFi 222 and UMTS 220 radio access interfaces may be used for a plurality of consecutive multipath time periods Dm to retrieve a plurality of parts of the requested content. The time during which both the WiFi 222 and UMTS 220 radio access interfaces are used for data retrieval (i.e., multipath reception) is referred to in FIG. 10 as the multipath reception period 1004.

In an alternative implementation, the mobile device 102 is arranged to determine if the data retrieved meets a content playback threshold by additionally or alternatively determining the amount of retrieved data stored in the playback buffer 217 and comparing the determined amount of retrieved data with a pre-defined amount of data. The pre-defined amount of data is based on the amount of data which is required by the mobile device 102 to provide continuous playback of the content by the mobile device 102 for a first period of time (for example, this will depend on the rate of playback of the requested content which depends on the encoding rate used to create the content). If the determined amount of retrieved data is less than the pre-defined amount for a second period of time (e.g., if the determined amount of data is less that 200 Kbytes for the last 10 seconds), then the playback is under risk of stopping soon if the data retrieval rate is not significantly increased. Thus, the mobile device 102 determines the data retrieved does not meet the content playback threshold when the determined amount of retrieved data stored in the playback buffer 217 is less than a pre-defined amount of data for a second time period. The pre-defined amount of data and the time period can be pre-configured in the TMP element 224. The first and second time periods may be the same or different.

During the multipath reception period 1004 when the WiFi radio access interface 222 and the UMTS radio access interface 220 are used to retrieve content, for each part of the requested content to be retrieved during a multipath time period Dm (e.g., for each next part of the requested content to be retrieved in a next multipath time period Dm), the part of the requested content is divided into at least a first portion for retrieval over the WiFi connection and at least a second portion for retrieval over the UMTS connection, step 908. The first and second portions are selected such that retrieval of the first and second portions during the multipath time period is estimated to meet the content playback threshold. The at least first and second portions of the part of the requested content are then retrieved simultaneously during the multipath time period Dm over the WiFi connection and the UMTS connection, respectively, step 910.

The portions of the requested content are retrieved simultaneously in the sense that a portion of the requested content is received via the WiFi radio access interface 222 at the same time or substantially at the same time as a portion of the requested content is received via the UMTS radio access interface 220 (that is, not sequentially).

For each part of the requested content to be retrieved during a multipath time period Dm, the mobile device 102 is configured (e.g., via the processing unit 202 under the control of the TMP element 224) to send to the remote server 118 a request over the WiFi connection for the first portion to be retrieved via the WiFi connection and a request over the UMTS connection for the second portion to be retrieved via the UMTS connection. The request for the first portion may include information indicating to the remote server 118 the length (e.g., number of bytes of data) of the first portion to be sent to the mobile device 102 and the request for the second portion may include information indicating to the remote server 118 the length (e.g., number of bytes of data) of the second portion to be sent to the mobile device 102.

The processing unit 202 under the control of the TMP element 224 may determine a rate of retrieval of data over the WiFi connection, and may then divide a part of the requested content to be retrieved during a multipath time period Dm (e.g., the next part of the requested content to be retrieved in a next multipath time period Dm) into at least a first portion of a first length for retrieval over the WiFi connection and a second portion of a second length for retrieval over the UMTS connection. The first length of the first portion is selected such that the first portion can be retrieved in the multipath period Dm based on the determined rate of retrieval of data over the WiFi connection and the second length of the second portion is dependent on the first length and the length of the part of the requested content to be retrieved, such that retrieval of the first and second portions during the multipath time period Dm is estimated to meet the content playback threshold. For example, the second length may be equal to the length of the part of the requested content to be retrieved minus the first length.

The number of bytes of content to be requested in a multipath period Dm (i.e., the number of bytes for a part of content) depends on the playback rate for the requested content (which depends on the encoding rate when the content was created) and the value of Dm. The number of bytes requested over the WiFi connection and the number of bytes requested over the UMTS connection depends on the measured rate of retrieval over the WiFi connection.

In the example arrangement which measures the first mean rate Tm (which is the mean traffic rate that is measured during the rate-controlled period 1002 and which is also the estimation of the playback rate, i.e., the rate by which data from the playback buffer 217 is consumed) and the second mean rate Ts, during the multipath reception period 1004, the task of the TMP element 225 is to ensure that content from the remote server 118 is downloaded or retrieved at a rate which is substantially equal to the first mean rate Tm. In order to download or retrieve content at a rate which is substantially equal to the first mean rate Tm, the TMP element 224 requests data from the remote server 118 every multipath time period Dm. The multipath time period Dm may be a pre-configured parameter and may be, as an example, 10 seconds. The number of bytes requested over the WiFi connection and the number of bytes requested over the UMTS connection depends on the last Measured second mean rate, Ts, calculated for the WiFi connection. The selection of the lengths of the first portion over the WiFi connection and the second portion over the UMTS connection is explained in more detail below.

For the WiFi connection, a length or byte range Gw of the first portion to be requested from the remote server 118, which is estimated to be received not later than Dm seconds (based on the last measured retrieval rate or throughput Ts) may be given by:

$$Gw = Ts \times Dm \qquad \text{Equation 1}$$

For the UMTS connection, a length or byte range Gg of the second portion to be requested from the remote server 118, taking account of the condition that the part of the requested content (Gg+Gw) to be retrieved in a multipath time period Dm from the remote server 118 should be retrieved at a rate which is substantially equal to the first mean rate Tm, may be determined from:

$$(Gw+Gg)/Dm = Tm \qquad \text{Equation 2}$$

As discussed above, the processing unit 202 under the control of the TMP element 224 calculates the rate of retrieval of data over the WiFi connection (e.g., the WiFi throughput Ts) in every multipath time period Dm and uses the calculated rate to calculate the values of Gw and Gg for the portions of data to be retrieved in the next multipath time period Dm.

Thus, as can be seen in FIG. 10, during the multipath reception period 1004, since the length or amount of data to be retrieved over the WiFi and UMTS connections during a next multipath time period is calculated every multipath time period, the amount of data retrieved over the WiFi and UMTS connections may vary between each multipath time period.

The remote server 118 is configured to support requests for data specified as lengths of data (e.g., byte-ranges). The remote server 118 may be an HTTP 1.1 server. HTTP 1.1 servers are arranged to send to the client (e.g., the mobile device 102) the range of bytes specified by the client. If the client requests a byte range which exceeds the content size, the HTTP server responds with a suitable code and the client is informed that the end of the content has been reached.

In an example arrangement, the processing unit 202 under the control of the TMP element 224 starts the multipath reception period 1004 by storing the last byte successfully received and by releasing the existing WiFi connection over the WiFi radio access interface 222. On release of the existing WiFi connection, the remote server 118 temporarily may stop sending more content to the mobile device 102. This temporary stopping of sending content lasts for a very short period because immediately after, the processing unit under the control of the TMP element 224 activates (or initiates) two new connections to the remote server 118, one WiFi connection over the WiFi radio access interface 222 and another UMTS connection over the UMTS radio access interface 220, and requests over the WiFi connection and the UMTS connection additional content from the remote server 118.

For example, if at the start of the multipath reception period 1004, the processing unit 202 under the control of the TMP element 224 stores the last byte Bs of retrieved content and then activates the WiFi and UMTS connections, the request to the remote server 118 over the WiFi connection may include information requesting bytes 'Bs+1' to 'Bs+50 Kbytes' of the requested content over the WiFi connection and the request to the remote server 118 over the UMTS connection may include information requesting bytes 'Bs+1+50 Kbytes' to 'Bs+64 Kbytes' over the UMTS connection. In this case, the part of the requested content to be retrieved in a multipath period Dm is 64 Kbytes of data.

Every multipath time period Dm, the processing unit 202 under the control of the TMP element 224 receives part of the requested content over both the WiFi connection and the UMTS connection and forwards the overall content to the media player element 218, which is then added to the playback buffer 217 and is scheduled for playback. The part of the requested content may be received via the two connections and stored in a temporary buffer (which may be, for example, included in the TMP element 224) and the processing unit 202 under the control of the TMP element 224 may reassemble the data received from the multiple connections before providing the data to the playback buffer 217. This helps to resolve any delay differences between the WiFi 110 and UMTS 104 networks.

During a streaming session, the multipath reception period, during which both WiFi and UMTS connections are used to retrieve data, may not occur at all. For example, when the WiFi connection provides enough throughput during the entire session to support the required playback rate, the condition for multipath activation does not arise and there is no need to activate the UMTS radio interface 220. When, however, the WiFi connection cannot provide the throughput to support the required playback rate for some pre-configured time period, the TMP element 224 switches to multipath mode of operation, as illustrated at point 1006 in FIG. 10.

During the multipath reception period 1004 when the WiFi 222 and UMTS 220 radio access interfaces are used to retrieve at least one part of requested content, the mobile device 102 (e.g., by means of the processing unit 202 under the control of the TMP element 224) determines a rate of retrieval of data over the WiFi connection based on the rate of retrieval of a first portion of the at least one part of the requested content over the WiFi connection during a multipath time period Dm. The mobile device (e.g., by means of the processing unit 202 under the control of the TMP element 224) deactivates the UMTS interface 220 in response to determining that the determined rate of retrieval of data over the WiFi connection now meets the content playback threshold (as described above) and retrieves data of the requested content over only the WiFi connection until the requested content has been retrieved or when the retrieval of data over the WiFi connection is determined again not to meet the content playback threshold. Deactivating the UMTS radio access interface 220 may include releasing the UMTS connection and/or powering down the UMTS radio access interface 220 and/or not using the UMTS radio access interface 220 for retrieving content.

This disclosure describes a novel method to improve the content retrieval experience (e.g., support high-quality progressive download streaming or other throughput-intensive services) by exploiting the multi-RAT (radio access technology) capabilities of modern mobile devices. In contrast to other technologies (for example, as described in the introduction) which lower the stream data rate or traffic rate in order to combat throughput degradations, the method in this disclosure combats the throughput degradations by the mobile device being configured to activate at least one additional radio access interface and using two (or multiple) radio interfaces to retrieve different parts of the media content simultaneously. As a consequence, the streaming session can be continued with high quality and the aggregate throughput can remain at relatively high levels even when one available radio access technology is congested. This is specifically true when the different paths or connections over the different radio access interfaces feature low cross-correlation properties and, thus, the occurrences of congestion or low throughput on the different radio access interfaces are independent and uncorrelated. In other words and with reference to the example described above of a mobile device with WiFi and UMTS radio access interfaces, when the WiFi connection is congested, it is unlikely that the UMTS connection will be congested too.

Since the mobile device in accordance with the disclosure uses a first radio access technology connection to retrieve data until the mobile device determines from the data retrieved that the radio conditions are such that a playback threshold is not met (e.g., when the retrieval rate is less than the playback rate) and only then activates a second radio access technology connection so that data can be retrieved over both connections, the solution in accordance with the disclosure therefore does not require the remote or streaming server to perform rate adaptation. Nor does it require the mobile device to feedback QoS measurement data to the remote or streaming server. It also does not require the remote or streaming server to maintain content encoded in various coding rates so that adaptation is possible or to maintain content encoded as a series of many chunks. The solution in accordance with the disclosure therefore does not suffer from the disadvantages of the adaptive streaming methods discussed in the introduction.

The mobile device in accordance with the disclosure can select when and how the available radio access technology connections are used. For example, in the case of the mobile device supporting WiFi and UMTS, the mobile device may prefer WiFi access to be used as much as possible and to utilize some UMTS capacity only when the WiFi capacity is not sufficient to maintain high quality streaming. Thus, if the second radio access interface is more costly, such as UMTS, the mobile device can arrange such that the second radio access interface is only utilized when the first radio access interface (less costly, such as WiFi) is not sufficient to maintain high-quality streaming and divides the data to be retrieved such that as much as possible is retrieved over the less costly radio access interface. For example, when the streaming session takes place over WiFi, the mobile device will continue to use only WiFi as long as the WiFi connection has enough capacity for the high quality stream to be received. When the WiFi gets congested and cannot support more than say 800-1000 Kbps (which is typically required for high-quality mobile streaming), only then is the UMTS interface activated and used to supplement the throughput that is provided over the WiFi interface. This way, the mobile device can select when and how the available radio access interfaces are used so as to keep the overall communication costs to a minimum. In addition, the solution in accordance with the disclosure enables the wide-area mobile network to be off-loaded from streaming traffic as much as possible.

Thus, by dynamically activating (and de-activating) radio interfaces based on the measured transport conditions, the second radio access technology connection may be used on a per-need basis. If the first radio access technology connection is adequate to maintain high quality streaming, the second radio access technology connection may not activated. Thus, battery consumption is not unnecessarily increased and the solution in accordance with the disclosure can reduce battery consumption compared to the known arrangements described in the introduction which improve the video streaming performance by requiring the mobile device to keep multiple interfaces continuously active.

In contrast to HLS/DASH or other similar adaptive streaming technologies, the solution in accordance with the disclosure does not switch to a lower quality stream when the available capacity is reduced but, instead, a second connection is activated (over a second radio access) to supplement the capacity of the first connection (over a first radio access). Thus, high quality streaming can be sustained which improves user experience compared to the HLS/DASH methods.

Since the embodiments in accordance with the disclosure are implemented on the mobile device 102, the solution does not require any upgrade on the network side. Thus, the media/HTTP servers (e.g., YouTube servers) do not need to be upgraded and there is no need for a proxy function (as with MPTCP).

Furthermore, the embodiments in accordance with the disclosure do not require any low-level upgrades on the mobile device (client side). To support MPTCP in the mobile device, the mobile device's kernel (i.e., transport layer) is typically upgraded in order to enhance the networking layer. This requires the device's operating system to be changed and so can be a costly process. In the solution described in this disclosure, only a new service component is required in the application layer which makes implementation considerably easier.

The disclosure has been described with respect to a mobile device capable of communicating with two access networks. It will be appreciated that the disclosure may also be implemented in a mobile device capable of communicating with two or more access networks, so that the requested content may be received over two or more connections with two or more access networks in order to meet the required playback threshold.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program and system/device elements are merely illustrative and that alternative embodiments may merge elements or impose an alternate decomposition of functionality upon various elements.

The invention claimed is:

1. A method for retrieving content by a wireless communication device having a first radio access interface for communication with a first access network and a second radio access interface for communication with a second access network, the method in the wireless communication device comprising:

receiving a request for retrieval of content from a remote server;

retrieving data of the requested content as a continuous stream of data over a first radio access technology connection and via the first radio access interface;

determining an amount of retrieved data stored in a playback buffer of the wireless communication device;

determining if the data retrieved meets a content playback threshold, the content playback threshold being defined by a data rate required to provide continuous playback of the requested content by the wireless communication device, wherein determining if the data retrieved meets the content playback threshold includes comparing the determined amount of retrieved data with a pre-defined amount of data, the pre-defined amount of data being based on the amount of data which is required by the wireless communication device to provide continuous playback of the content by the wireless communication device for a first period of time, and determining the data retrieved does not meet the content playback threshold when the determined amount of retrieved data stored in the playback buffer is less than the pre-defined amount of data for a second period of time;

activating the second radio access interface for retrieval of data of the requested content over a second radio access technology connection when the data retrieved over the first radio access technology connection is determined not to meet the content playback threshold;

using the first and second radio access interfaces to retrieve part of the requested content during a multipath time period, the first and second radio access interfaces being used during at least one multipath time period to retrieve at least one part of the requested content;

for each part of the requested content to be retrieved during a multipath time period, dividing the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieving simultaneously during the multipath time period the first portion of the part of the requested content over the first radio access technology connection and the second portion of a part of the requested content over the second radio access technology connection.

2. The method of claim 1, further comprising determining a rate of playback of the content by the wireless communication device, and wherein determining if the data retrieved meets the content playback threshold includes comparing a rate of retrieval of data by the wireless communication device over the first radio access technology connection with the rate of playback and determining the data retrieved does not meet the content playback threshold when the rate of retrieval of data is less than the rate of playback of content for a defined period of time.

3. The method of claim 2, wherein determining a rate of playback of content by the wireless communication device includes estimating the rate of playback of content by determining a first mean rate of retrieval of data by the wireless communication device over the first radio access technology connection after a start of data retrieval and over a first time period, and wherein determining if the data retrieved meets the content playback threshold includes:

estimating the rate of retrieval of data by determining a second mean rate of retrieval of data by the wireless communication device over the first radio access technology connection over a second time period, and comparing the first mean rate with the second mean rate and determining the data retrieved does not meet the content playback threshold when the second mean rate is less than the first mean rate for the defined period of time.

4. The method of claim 1, wherein using the first and second radio access interfaces further includes, for each part of the requested content to be retrieved during a multipath time period, sending to the remote server a request for the first portion over the first radio access technology connection and a request for the second portion over the second radio access technology connection.

5. The method of claim 1, further including:

when the first and second radio access interfaces are used to retrieve at least one part of requested content, determining a rate of retrieval of data over the first radio access technology connection based on the rate of retrieval of a first portion of the at least one part of the requested content over the first radio access technology connection;

deactivating the second radio access interface in response to determining that the determined rate of retrieval of data over the first radio access technology connection meets the content playback threshold and retrieving data of the requested content over only the first radio access technology connection until the requested content has been retrieved.

6. The method of claim 5, wherein deactivating the second radio access interface includes at least one of:

releasing the second radio access technology connection;
powering down the second radio access interface; and
not using the second radio access interface for retrieving content.

7. The method of claim 1, further including:

determining a rate of retrieval of data over the first radio access technology connection, and wherein dividing includes dividing a part of the requested content to be retrieved into at least a first portion of a first length for retrieval over the first radio access technology connection and a second portion of a second length for retrieval over the second radio access technology connection, wherein the first length of the first portion is selected such that the first portion can be retrieved in the multipath time period based on the determined rate of retrieval of data over the first radio access technology connection and the second length of the second portion is dependent on the first length and the length of the part of the requested content to be retrieved.

8. A wireless communication device including:
a first radio access interface for communication with a first access network;
a second radio access interface for communication with a second access network; and
a processing unit configured to:
in response to receiving a request for retrieval of content from a remote server, retrieve data of the requested content as a continuous stream of data over a first radio access technology connection and via the first radio access interface;
determine a rate of playback of the content by the wireless communication device and includes estimating the rate of playback of content by determining a first mean rate of retrieval of data by the wireless communication device over the first radio access technology connection after a start of data retrieval and over a first time period;
determine if the data retrieved meets a content playback threshold, the content playback threshold being defined by a data rate required to provide continuous playback of the requested content by the wireless communication device and includes:
  estimating the rate of retrieval of data by determining a second mean rate of retrieval of data by the wireless communication device over the first radio access technology connection over a second time period;
  comparing the first mean rate with the second mean rate; and
  determining the data retrieved does not meet the content playback threshold when he second mean rate is less than the first mean rate for a defined period of time;
activate the second radio access interface for retrieval of data of the requested content over a second radio access technology connection when the data retrieved over the first radio access technology connection is determined not to meet the content playback threshold;
use the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, divide the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieve simultaneously during the multipath time period the first portion of the part of the requested content over the first radio access technology connection and the second portion of a part of the requested content over the second radio access technology connection.

9. The wireless communication device of claim 8, wherein the processing unit is further configured to determine a rate of playback of the content by the wireless communication device, and wherein the processing unit is configured to determine if the data retrieved meets the content playback threshold by comparing a rate of retrieval of data by the wireless communication device over the first radio access technology connection with the rate of playback and determining the data retrieved does not meet the content playback threshold when the rate of retrieval of data is less than the rate of playback of content for a defined period of time.

10. The wireless communication device of claim 8, wherein the processing unit is further configured to:
when the first and second radio access interfaces are used to retrieve at least one part of requested content, determine a rate of retrieval of data over the first radio access technology connection based on the rate of retrieval of a first portion of the at least one part of the requested content over the first radio access technology connection;
deactivate the second radio access interface in response to determining that the determined rate of retrieval of data over the first radio access technology connection meets the content playback threshold and retrieve data of the requested content over only the first radio access technology connection until the requested content has been retrieved.

11. The wireless communication device of claim 10, wherein the processing unit is configured to deactivate the second radio access interface by at least one of:
releasing the second radio access technology connection;
powering down the second radio access interface; and
not using the second radio access interface for retrieving content.

12. The wireless communication device of claim 8, wherein the processing unit is further configured to:
determine a rate of retrieval of data over the first radio access technology connection, and
wherein the processing unit is configured to divide a part of the requested content to be retrieved into at least a first portion of a first length for retrieval over the first radio access technology connection and a second portion of a second length for retrieval over the second radio access technology connection, wherein the first length of the first portion is selected such that the first portion can be retrieved in the multipath time period based on the determined rate of retrieval of data over the first radio access technology connection and the second length of the second portion is dependent on the first length and the length of the part of the requested content to be retrieved.

13. The wireless communication device of claim 8, further including:
a media player element for controlling the processing unit to render the requested content from the remote server;
a transparent multipath proxy element for intercepting data between the media player element and the remote server and for controlling the processing unit to determine when requested content is to be retrieved using only the first radio access interface and when requested content is to be retrieved using both the first and second radio access interfaces; and
a memory for storing routing policies for routing data between the media player element and the remote server via the transparent multipath proxy element, wherein the transparent multipath proxy element is arranged to configure the processing unit to route data between the media player element and the remote server via the transparent multipath proxy using the routing policies.

14. A communication system including:
a first radio access network;
a second radio access network;
a remote server for providing content as a continuous stream of data, the remote server being communicably coupled to the first and second radio access networks; and
at least one wireless communication device, the at least one wireless communication device including:
a first radio access interface for communication with the first access network;
a second radio access interface for communication with the second access network; and
a processing unit configured to:
in response to receiving a request for retrieval of content from the remote server, retrieve data of the requested content as a continuous stream of data over a first radio access technology connection and via the first radio access interface;
determine a rate of playback of the content by the wireless communication device and includes estimating the rate of playback of content by determining a first mean rate of retrieval of data by the wireless communication device over the first radio access technology connection after a start of data retrieval and over a first time period;
determine if the data retrieved meets a content playback threshold, the content playback threshold being defined by a data rate required to provide continuous playback of the requested content by the wireless communication device and includes:
estimating the rate of retrieval of data by determining a second mean rate of retrieval of data by the wireless communication device over the first radio access technology connection over a second time period;
comparing the first mean rate with the second mean rate; and
determining the data retrieved does not meet the content playback threshold when he second mean rate is less than the first mean rate for a defined period of time
determine if the data retrieved meets a content playback threshold, the content playback threshold being defined by a data rate required to provide continuous playback of the requested content by the wireless communication device;
activate the second radio access interface for retrieval of data of the requested content over a second radio access technology connection when the data retrieved over the first radio access technology connection is determined not to meet the content playback threshold;
use the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, divide the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieve simultaneously during the multipath time period the first portion of the part of the requested content over the first radio access technology connection and the second portion of a part of the requested content over the second radio access technology connection.

15. A method for retrieving content by a wireless communication device having a first radio access interface for communication with a first access network and a second radio access interface for communication with a second access network, the method in the wireless communication device comprising:
receiving a request for retrieval of content from a remote server;
retrieving data of the requested content as a continuous stream of data over a first radio access technology connection and via the first radio access interface;
determining a rate of playback of the content by the wireless communication device and includes estimating the rate of playback of content by determining a first mean rate of retrieval of data by the wireless communication device over the first radio access technology connection after a start of data retrieval and over a first time period;
determining if the data retrieved meets a content playback threshold, the content playback threshold being defined by a data rate required to provide continuous playback of the requested content by the wireless communication device, wherein determining if the data retrieved meets the content playback threshold includes:
estimating the rate of retrieval of data by determining a second mean rate of retrieval of data by the wireless communication device over the first radio access technology connection over a second time period;
comparing the first mean rate with the second mean rate; and
determining the data retrieved does not meet the content playback threshold when he second mean rate is less than the first mean rate for a defined period of time;
activating the second radio access interface for retrieval of data of the requested content over a second radio access technology connection when the data retrieved over the first radio access technology connection is determined not to meet the content playback threshold;
using the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, dividing the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieving simultaneously during the multipath time period the first portion of the part of the requested content over the first radio access technology connection and the second portion of a part of the requested content over the second radio access technology connection.

16. A method for retrieving content by a wireless communication device having a first radio access interface for communication with a first access network and a second radio access interface for communication with a second access network, the method in the wireless communication device comprising:
receiving a request for retrieval of content from a remote server;

retrieving data of the requested content as a continuous stream of data over a first radio access technology connection and via the first radio access interface;
determining if the data retrieved meets a content playback threshold, the content playback threshold being defined by a data rate required to provide continuous playback of the requested content by the wireless communication device;
activating the second radio access interface for retrieval of data of the requested content over a second radio access technology connection when the data retrieved over the first radio access technology connection is determined not to meet the content playback threshold;
using the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, dividing the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieving simultaneously during the multipath time period the first portion of the part of the requested content over the first radio access technology connection and the second portion of a part of the requested content over the second radio access technology connection;
when the first and second radio access interfaces are used to retrieve at least one part of requested content, determining a rate of retrieval of data over the first radio access technology connection based on the rate of retrieval of a first portion of the at least one part of the requested content over the first radio access technology connection; deactivating the second radio access interface in response to determining that the determined rate of retrieval of data over the first radio access technology connection meets the content playback threshold and retrieving data of the requested content over only the first radio access technology connection until the requested content has been retrieved and wherein deactivating the second radio access interface includes at least one of:
releasing the second radio access technology connection;
powering down the second radio access interface; and
not using the second radio access interface for retrieving content.

17. A wireless communication device including:
a first radio access interface for communication with a first access network;
a second radio access interface for communication with a second access network; and
a processing unit configured to:
in response to receiving a request for retrieval of content from a remote server, retrieve data of the requested content as a continuous stream of data over a first radio access technology connection and via the first radio access interface;
determine an amount of retrieved data stored in a playback buffer of the wireless communication device determine if the data retrieved meets a content playback threshold, the content playback threshold being defined by a data rate required to provide continuous playback of the requested content by the wireless communication device wherein determining if the data retrieved meets the content playback threshold includes comparing the determined amount of retrieved data with a pre-defined amount of data, the pre-defined amount of data being based on the amount of data which is required by the wireless communication device to provide continuous playback of the content by the wireless communication device for a first period of time, and determining the data retrieved does not meet the content playback threshold when the determined amount of retrieved data stored in the playback buffer is less than the pre-defined amount of data for a second period of time;
activate the second radio access interface for retrieval of data of the requested content over a second radio access technology connection when the data retrieved over the first radio access technology connection is determined not to meet the content playback threshold;
use the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, divide the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieve simultaneously during the multipath time period the first portion of the part of the requested content over the first radio access technology connection and the second portion of a part of the requested content over the second radio access technology connection.

18. A wireless communication device including:
a first radio access interface for communication with a first access network;
a second radio access interface for communication with a second access network; and
a processing unit configured to:
in response to receiving a request for retrieval of content from a remote server, retrieve data of the requested content as a continuous stream of data over a first radio access technology connection and via the first radio access interface;
determine if the data retrieved meets a content playback threshold, the content playback threshold being defined by a data rate required to provide continuous playback of the requested content by the wireless communication device;
activate the second radio access interface for retrieval of data of the requested content over a second radio access technology connection when the data retrieved over the first radio access technology connection is determined not to meet the content playback threshold;
use the first and second radio access interfaces to retrieve part of the requested content during a multipath time period, the first and second radio access interfaces being used during at least one multipath time period to retrieve at least one part of the requested content;
for each part of the requested content to be retrieved during a multipath time period, divide the part of the requested content into at least a first portion for retrieval over the first radio access technology connection and at least a second portion for retrieval over the second radio access technology connection, wherein the first and second portions are selected such that retrieval of the first and second portions during the multipath time period is estimated to meet the content playback threshold, and retrieve simultaneously during the multipath time period the first portion of the part of the requested content over the first radio access technology connection and the second portion of a part of the requested content over the second radio access technology connection; and when the first and second radio access interfaces are used to retrieve at least one part of requested content, determine a rate of retrieval of data over the first radio access technology connection based on the rate of retrieval of a first portion of the at least one part of the requested content over the first radio access technology connection; deactivate the second radio access interface in response to determining that the determined rate of retrieval of data over the first radio access technology connection meets the content playback threshold and retrieve data of the requested content over only the first radio access technology connection until the requested content has been retrieved and wherein deactivating the second radio access interface includes at least one of:
releasing the second radio access technology connection;
powering down the second radio access interface; and
not using the second radio access interface for retrieving content.

* * * * *